United States Patent [19]

Cabrera et al.

[11] Patent Number: 5,517,350
[45] Date of Patent: May 14, 1996

[54] OPTICAL COMPONENT BASED ON LANGMUIR-BLODGETT LAYERS

[75] Inventors: Ivan Cabrera, Dreieichenhain; Uwe Falk, Wiesbaden; Werner Hickel, Ludwigshafen, all of Germany; Donald Lupo, Kawagoe, Japan; Andreas Mayer, Hattersheim/Main, Germany; Georg Pawlowski, Wiesbaden, Germany; Ude Scheunemann, Liederbach/Taunus, Germany

[73] Assignee: Hoechst Aktiengesellschaft, Germany

[21] Appl. No.: 366,022

[22] Filed: Dec. 29, 1994

Related U.S. Application Data

[63] Continuation of Ser. No. 142,231, Oct. 25, 1993, abandoned.

[30] Foreign Application Priority Data

Oct. 27, 1992 [DE] Germany ............... 42 36 243.1

[51] Int. Cl.$^6$ .................................................. G02F 1/35
[52] U.S. Cl. ...................... 359/326; 252/582; 427/162
[58] Field of Search .................................. 385/122, 141, 385/143, 145; 359/326–332; 252/582, 587, 588, 589; 427/162–164

[56] References Cited

U.S. PATENT DOCUMENTS

| | | | |
|---|---|---|---|
| 4,792,208 | 12/1988 | Ulman et al. | 385/143 |
| 4,796,971 | 1/1989 | Robello et al. | 385/143 X |
| 4,886,339 | 12/1989 | Scozzafava et al. | 385/141 |
| 5,008,043 | 4/1991 | Robello et al. | 252/582 |
| 5,150,446 | 9/1992 | Penner et al. | 385/122 |
| 5,204,178 | 4/1993 | Licht et al. | 428/333 |
| 5,254,655 | 10/1993 | Gibbons et al. | 528/15 |
| 5,272,002 | 12/1993 | Penner et al. | 427/164 X |

FOREIGN PATENT DOCUMENTS

| | | |
|---|---|---|
| 0313477B1 | 4/1989 | European Pat. Off. |
| 0313476 | 4/1989 | European Pat. Off. |
| 0313474B1 | 4/1989 | European Pat. Off. |
| 0313474 | 4/1989 | European Pat. Off. |
| 0370922 | 5/1990 | European Pat. Off. |
| 0525665 | 2/1993 | European Pat. Off. |
| 0533136 | 3/1993 | European Pat. Off. |
| WO92/10781 | 6/1992 | WIPO. |

OTHER PUBLICATIONS

Electronics Letters, Apr. 24, 1986, vol. 22, No. 9, pp. 460–461, Neal et al, "Second Harmonic . . . ".

Synthetic Metals, 28 (no month) (1989), pp. D711–D719, Neal et al, "Multilayer Assemblies . . . ".

Journal of Molecular Electronics, vol. 1 (no month) (1985), pp. 25–45, Zyss, "Nonlinear Organic . . . ".

Synthetic Metals, 28 (no month) (1989), pp. D683–D688, Anderson et al, "Quadratically Enhanced . . . ".

*Primary Examiner*—John D. Lee
*Attorney, Agent, or Firm*—Curtis, Morris & Safford

[57] ABSTRACT

An optical component comprises an electromagnetic radiation-transparent polymeric medium having a second-order susceptibility of at least $10^{-9}$ electrostatic units where this polymeric medium comprises compounds having polar-aligned noncentrosymmetric molecular dipoles which have as structural element an electron acceptor which is bound to an electron donor via a conjugated π-electron system, which makes possible an oscillation of the molecular dipole between a ground state having a first dipole moment and an electronically excited state having a second dipole moment different from the first, and the nonionic polymeric medium comprises an alternating arrangement of at least one Langmuir-Blodgett film each of at least two different nonionic polymers having nonlinear optical properties. Besides high mechanical and chemical stability the optical component of the invention has excellent nonlinear optical properties, for example frequency-doubling.

10 Claims, 4 Drawing Sheets

Fig. 1
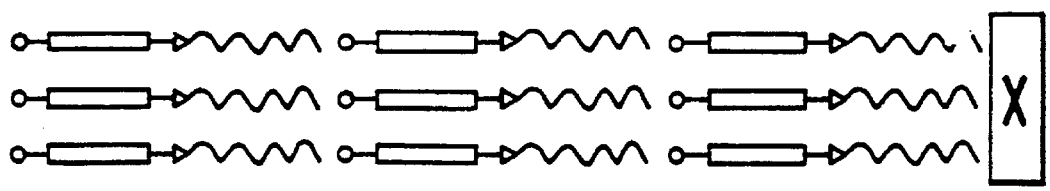
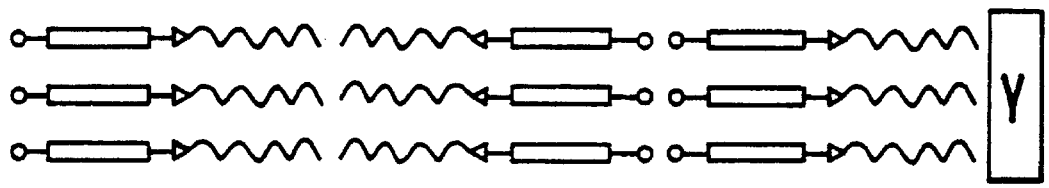
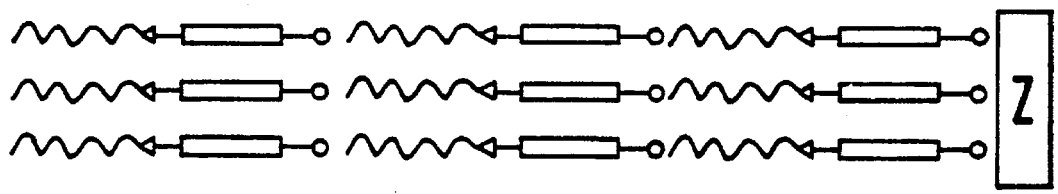
ALKYL CHAIN
NLO-GROUP
△ DONOR
○ ACCEPTOR

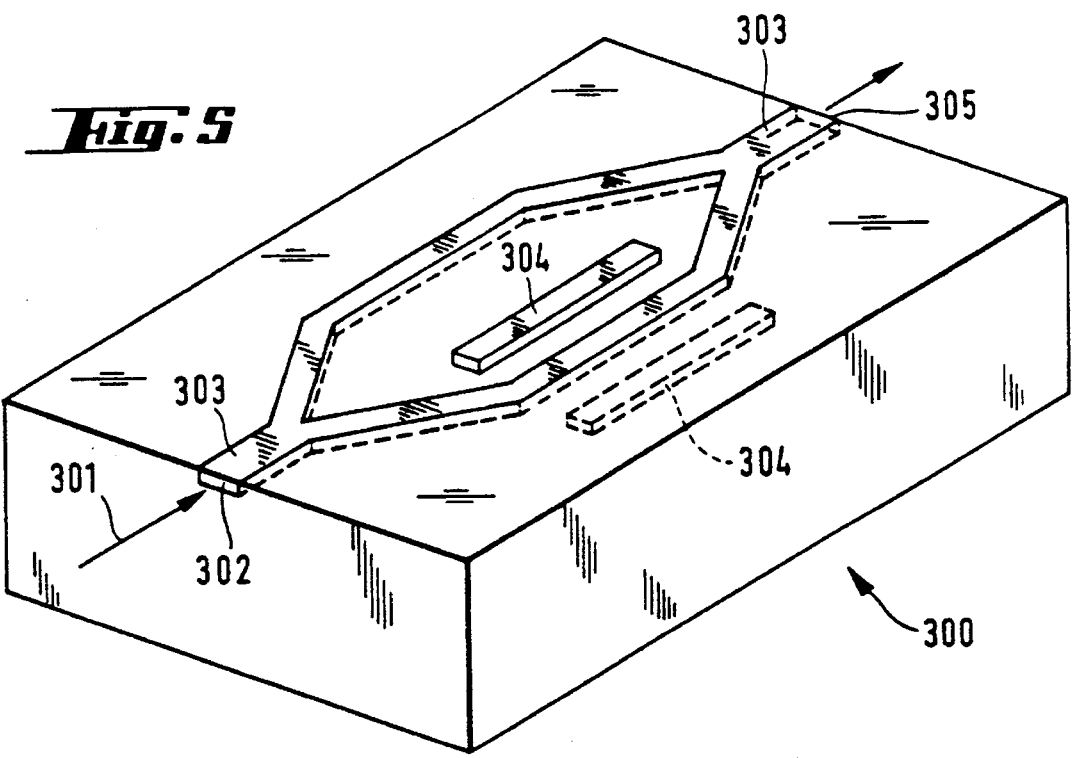
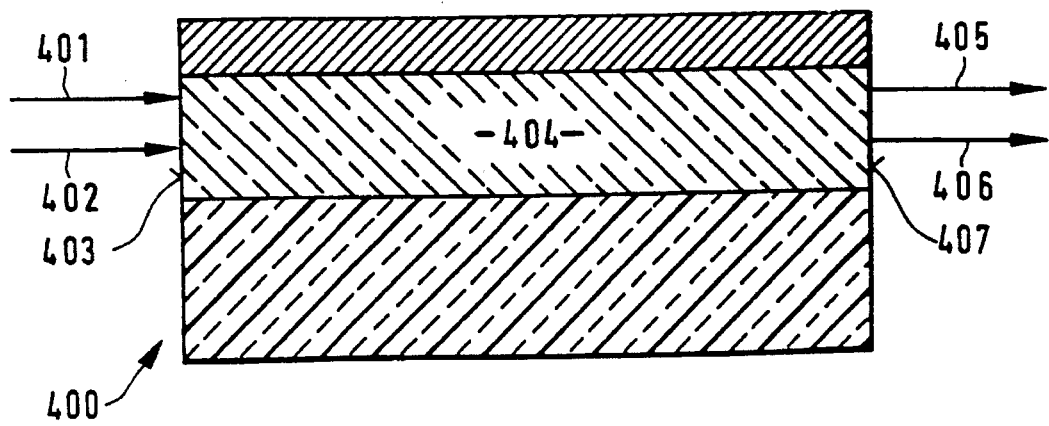

OPTICAL COMPONENT BASED ON LANGMUIR-BLODGETT LAYERS

This application is a continuation of application Ser. No. 08/142,231, filed Oct. 25, 1993 (abandoned).

The invention relates to an optical component based on active-active Langmuir-Blodgett (LB) layers comprising side-chain polymers whose main chains comprise aliphatic chain members and whose side chains comprise a conjugated π-electron system as a nonlinear optical (NLO) chromophore one end of which is an electron donor (D) and the other end of which is an electron acceptor (A), where both the donor and the acceptor are bifunctional groups and therefore the chromophore can be linked via the acceptor side or via the donor side to the main chain. The invention furthermore relates to a process for preparing monomers of the side-chain polymers of the invention.

Nonlinear optics is a part of optics which studies the nonlinear interactions of light with materials. These appear clearly when the electrical field strength of a light wave is not small in comparison with the field strength which is responsible for bonding the individual building blocks of a material to one another, including in particular that of the electrons in atoms and molecules. In the optical frequency range, fields of sufficiently high field strength have been available since the development of the laser. When a laser beam passes through an optically nonlinear material the nonlinear electrical polarization causes light with completely different properties, for example different frequencies, to be produced.

The polarization P which is induced in a medium by an electric field can be expressed by a power series of the electrical field strength E, $$P = X^{(1)} + X^{(2)}E^2 + X^{(3)}E^3 + \ldots$$

where X is the electric susceptibility. The NLO interactions can cause the production of new frequencies and also alter the refractive indices of the material. The susceptibilities $X^{(2)}$ and $X^{(3)}$ are dependent on the so-called molecular hyperpolarizabilities β and γ.

$$p = \alpha E + \beta E^2 + \gamma E^3 + \ldots \quad X^{(2)}(-w1, w2, w1)_{xyz} = N$$
$$f_{x(w3)} f_{y(w2)} f_{x(w1)} D_{XYZxyz} \beta_{xyz}$$

Here N is the number of molecules per unit volume, f is the local field factor and $D_{XYZxyz}$ is a tensor which describes the alignments of the molecules in the macroscopic system.

Important nonlinear optical effects which depend on $X^{(2)}$ are the frequency doubling of a laser beam, the parametric amplification of a weak light signal and the electro-optical conversion of electric signals. To obtain these second-order effects the active molecules must be aligned noncentrosymmetrically, since for centrosymmetric materials $X^{(2)} = 0$.

Nonlinear optics has the potential, through switching and multiplication of optical frequencies and the conversion of electrical information into optical information, to bring the technology of data transmission and storage to a much higher level. Nonlinear optical materials are suitable for the production of nonlinear optical components. Examples of these are electro-optical modulators, electro-optical switches, electro-optical couplers and frequency doublers. These components have applications, for example, in optical communications technology, for modulation and control of optical signals, as steric light modulators in optical signal processing, for frequency doubling of semiconductor lasers, for optical data storage, sensor technology and xerography.

Possible nonlinear optical materials are organic or inorganic substances such as potassium dihydrogen phosphate (KDP) and lithium niobate. Already commercially available are, for example, modulators of lithium niobate and frequency doublers of KDP.

Organic nonlinear optical materials are nevertheless of greatest interest. One reason for this, inter alia, is that the nonlinearity of organic materials can be very much greater than that of inorganic materials. The refractive index and the dielectric constant are generally lower. This makes possible higher internal electric fields, smaller polarizations and lower reflection losses which all lead to higher activity in comparison with inorganic materials.

In addition, organic materials can be "tailor made" to obtain, for example, materials with the desired transparency at the applicable wavelengths. The many possible processing methods of organic materials are also an important factor. For the state of research in nonlinear optical organic materials reference may be made, for example, to Williams, D. J.; Angew. Chem. 96 (1984) 637 and Marder, S., Sohn, J., Stucky, G.; "Materials for Nonlinear Optics" (1991), Am. Chem. Soc. Symp. Ser. 455, Washington DC, 750 p.

As already mentioned, to obtain the $X^2$ effect materials having a noncentrosymmetric structure are required. Research is presently being focused, inter alia, on the areas below:
1. crystals which have no point symmetry,
2. poled polymers,
3. physical and chemical sorption,
4. layers.

The LB process seems to offer the greatest freedom in chemical planning. In this process molecules are spread on a water surface, oriented in parallel to one another by reduction of the surface area per molecule, and by using constant thrust during dipping and taking out a support are applied to a substrate. Each time the substrate is dipped a monomolecular layer is transferred with retention of its orientation. For building up LB layers amphiphilic molecules are used, i.e. molecules which have a hydrophilic end ("head") and a hydrophobic end ("tail").

To make possible LB layers having higher second-order susceptibilities, organic compounds are prepared which have both high molecular second-order hyperpolarizabilities β and amphiphilic properties. A compound has a high value of β if it contains a conjugated electron system (for example a stilbene unit) in which one or more electron donor groups and one or more electron acceptor groups are incorporated. A hydrophobic group is appended at the donor or acceptor end. The hyperpolarizability is increased if the molecule absorbs light in the wavelength region of the irradiating electric field or the field produced by NLO effects (so-called resonance amplification). Absorption is however not desired in many applications since it causes intensity losses and impairs the optical stability (the light intensity which can be tolerated without permanent changes in the material). An ideal compound has a high hyperpolarizability without absorbing in the desired wavelength region.

Numerous publications have reported NLO measurements on LB films. Hemicyanine, merocyanine, azo and stilbene chromophores, inter alia, have been used for this (see for example J. D. Swalen, Annu. Rev. Mater. page 21 (1991) 373).

For films which comprise a single material there are three types of dipping behavior (FIG. 1).
Transfer on downstroke (X films)
Transfer on upstroke (Z films)
Transfer on downstroke and upstroke (Y films)
X and Z films lead to noncentrosymmetric structures but generally have low mechanical stability. Most materials form Y films, i.e. head-head-tail-tail structures, which usually leads to centrosymmetric structures. There are however also known examples of compounds which are partially oriented in the support plane by the dipping process and hence form noncentrosymmetric Y films, but the susceptibilities achieved are unsatisfactory (see for example G. Decher et al., J. Chem. Soc. Chem. Comm. 1988 933).

To construct noncentrosymmetric layers of materials which form Y films two strategies may be followed:

a) a film is formed of alternate active and inactive layers (see for example Girling, I. R. et al. Thin Solid Films (1985) 132, 101, Ledoux, I., et al. Europhys. Lett (1987) 3, 803). This method has the disadvantage that the possible NLO activity of the molecules is not efficiently exploited, since the use of inactive layers leads to a "dilution" of the system, i.e. films of a particular thickness have a lower NLO activity.

b) Films are formed from two active amphiphiles which have dipole moments in the opposite direction to the alkyl-chain radical. This causes the dipole moments to add rather than cancel. (FIG. 2)

To put this strategy into practice, two systems having different chromophores may be used (see for example D. B. Neal et al., Electron. Lett. 22 (1986) 460 and D. B. Neal et al., Synth. Met. 28 (1989) 711) or two systems having the same chromophore, where one system has the hydrophobic group bound to the donor side while the other system has the chromophore linked to the acceptor side (see for example J. Zyss, J. Mol. Electron. 1 (1985) 25), may be used. Theoretically this last combination offers the best opportunities since if the same chromophore is used both the steric requirements and the electrostatic interactions are approximately the same for both layers. In other words the packing of the layers generally becomes better, with the consequence that the NLO activity becomes greater. To enable such systems to be produced it is necessary to synthesize molecules which can be modified both on the donor side and on the acceptor side. EP-A-0 313 474 describes low molecular weight LB layers which have sulfonyl as the acceptor group. Although good results are achieved with such materials the films obtained are not as stable as those obtained, for example, by the self assembled films technique.

It is already known (for example L. B. Anderson et al., Synth. Met. 28 (1989) 683) that active/active LB films can be constructed of polymers. The hemicyanine systems described therein nevertheless have the big disadvantage that their absorption lies in the visible region. Furthermore, such charged systems are very hydrophilic. This results in a very strong hydrophile-hydrophobe interaction between the layers, which leads to layers with little stability. To avoid this, inactive layers must be incorporated, which then leads to the abovementioned low NLO activity. This, together with the very strong absorption in the visible region, makes these systems of little interest for frequency doubling of semiconductor lasers.

It has now been surprisingly found that certain, uncharged, α,β-unsaturated carboxylic acid-derived polymers which bear sulfonyl group-containing ester groups having NLO properties are suitable for constructing active/active LB layers. Such polymers are partly known from EP-A-0 313 476, EP-A-0 313 477 and EP-A-0 370 922, and the starting monomers from EP-A-0 313 474. The use of these polymers for constructing active/active LB layers has however not yet been described.

The invention therefore provides an optical component comprising an electromagnetic radiation-transparent polymeric medium having a second-order susceptibility of at least $10^{-9}$ electrostatic units, this polymeric medium comprising compounds having polar-aligned noncentrosymmetric molecular dipoles which have as structural element an electron acceptor which is bound to an electron donor via a conjugated $\pi$-electron system, which makes possible an oscillation of the molecular dipole between a ground state having a first dipole moment and an electronically excited state having a second dipole moment different from the first, wherein the nonionic polymeric medium comprises an alternating arrangement of at least one Langmuir-Blodgett film each of at least two different nonionic polymers having nonlinear optical properties.

BRIEF DESCRIPTION OF THE DRAWINGS

FIG. 1 is a schematical illustration of three types of dipping behavior for Langmuir-Blodgett films.

FIG. 5 shows a component for modulating a lightwave by means of the linear electrode-optical effect.

FIG. 6 shows a component for mixing and shifting light frequencies.

Figure 2:
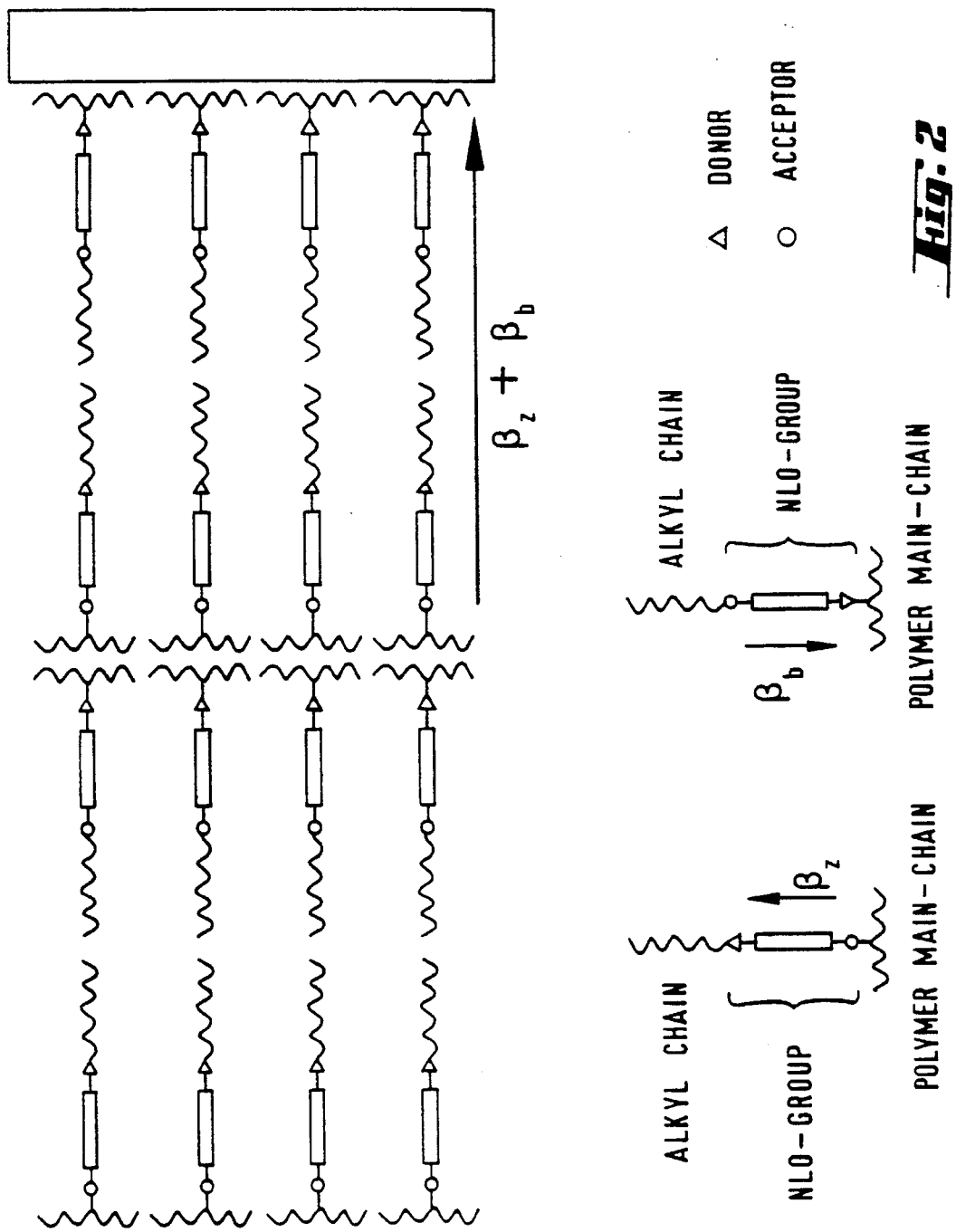
FIG. 2 is a schematical illustration of a film having two active amphiphiles which have dipole moments in the opposite direction to the alkyl-chain radical.

Besides high mechanical and chemical stability the optical components of the invention display excellent nonlinear optical properties, for example frequency doubling. Preferred polymers which can be used are all types of polyacrylates in which from 1 to 100%, preferably from 5 to 70%, particularly preferably from 20 to 50% of the ester groups comprise groups of either formula I or formula II.

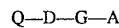

Q—D—G—A    I

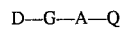

D—G—A—Q    II in which the symbols have the meanings below:

Q: $-(CH_2)_p-X$ with X: $-O-$, $-NR^1-$ where X indicates the connection to the main chain of the polymer, p: from 1 to 20, preferably from 2 to 16, particularly preferably from 3 to 12, where one or two $CH_2$ groups can also be replaced by O;

D: $-NR^2R^3$, $-O-R^4$, $-S-R^5$, where in compounds of formula I a radical R is replaced by Q;

A: $-SO_2-R^6$, $-BR^9R^{10}$,

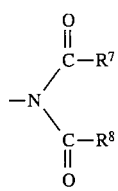

where in compounds of formula II a radical R is replaced by Q;

G: $-Ar-Y_{(n)}-Ar_{(m)}$ with Ar: 1,4-phenylene, naphthalene-2,6-diyl, thiazole-2,5-diyl, thiadiazole-2,5-diyl, thiophene-2,5-diyl, furan-2,5-diyl, oxazole-2,5-diyl, where either one or two hydrogen atoms can be replaced by $C_1$-$C_4$ alkyl or alkoxy groups, Y: $-C\equiv C-$, $-CH=CH-$, $N=N-$, $-CH=N-$, $-N=CH-$, $-NH-N=CH$, $-HC=N-NH-$; n, m: 0, 1, 2, 3;

$R^1, R^2, R^3, R^4, R^5, R^6, R^7, R^8, R^9, R^{10}$ are independently of one another a straight-chain or branched alkyl group having from 1 to 22, preferably from 1 to 16, particularly preferably from 1 to 12 carbon atoms, where one or more non-neighboring $CH_2$ groups can also be replaced by O, which gives ether structures, and where $R^7$ and $R^8$ can together also form a ring.

D and G can also be parts of a ring system, as a result of which one of the substituents R can be a single bond. Preferred groups are:

D: $NR^2, R^3, OR^4, SR^5$

A: $-SO_2-R^6$ and

G: $Ar^1-Y_{(m)}-Ar^2_n$ with $Ar^1, Ar^2$

Y: $-CH=CH-$ and n,m: 0,1,2

Particularly preferably, $Ar-Y_{(m)}-Ar_{(m)}$ is:

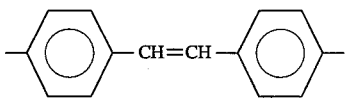

Preferred polyacrylates are random copolymers of the formula III $$[[CH_2-CZ^1-COW]_k[CH_2-CZ^2-COOV]_l[CH_2-CZ^3-COOU]_t] \quad III$$

in which $Z^1, Z^2, Z^3$: are independently of one another H, $CH_3$, $CF_3$, F, Cl, preferably H, $CH_3$, V: is H or an alkyl group having from 1 to 6, preferably from 1 to 4, carbon atoms, U: is a group Q—D—G—A (formula IIIa) or Q—A—G—D (formula IIIb) where Q, D, G, A are as defined above W: is $NR^{12}R^{13}$, $OR^{12}$ where $R^{12}$, $R^{13}$ are H or an alkyl group having from 1 to 22, preferably from 1 to 18, carbon atoms, t: is from 0.01 to 1.0, preferably from 0.05 to 0.7, particularly preferably from 0.2 to 0.5;

l: is from 0 to 0.5, preferably from 0.01 to 0.2, particularly preferably from 0.05 to 0.1 k: is from 0 to 0.99, preferably from 0.3 to 0.9, particularly preferably from 0.5 to 0.8.

Components according to the invention comprise alternating LB films of polyacrylates having groups of formula I or II. Preferably they comprise alternating polyacrylates of formula IIIa and IIIb. The groups of formula I and II are derived from the corresponding alcohols or amines, They can be prepared by literature methods which will be familiar to those skilled in the art, as described, for example, in "Houben Weyl, Methoden der Organischen Chemie, Thieme Verlag, Stuttgart". Use may be made of variants which are not further detailed here.

The synthesis of azo compounds (Y: $-N=N-$) is described, for example, in Houben Weyl, Methoden der Organischen Chemie Vol. 10/III.

Schiff bases (Y: $-CH=N-$) can be prepared, for example, as in P. Keller et al. Solid Phys. Suppl. 14, (1986) 19. Acetylenes (Y: $-C\equiv C-$) are obtained, for example, by the methods of M. Hooper et al., J. Chem. Soc. 1969, 2453 and J. M. Lehn et al., J. Chem. Soc. Commun. 1987, 1425. Stilbenes (Y: $-CH=CH-$) can be prepared, for example, by the Wittig, Wittig-Horner or Wittig-Horner-Emmons reaction (see for example EP-A 313 477, EP-A 313 476, EP 370 922, Nijhuis, S., Rikken, G. L. A., Havinga, E. E., ten Hoeve, W., Wynberg, H., Meijer, E. W., J. Chem. Soc., Chem. Commun. (1990) 1093 and Ulman, A., Wiland, C. S., Köhler, W., Robello, D. R., Williams, D. J., Handley, L., J. Am. Chem. Soc. (1990), 112, 7083).

In a preferred process which is likewise provided by the present invention compounds of formula I and/or II having Y: $CH=CH$ and A: $-SO_2-$ are prepared by condensation of toluenes of formula IV (a/b) with aldehydes of formula V (a/b)

  IVa

  IVb

  Va

  Vb in which the symbols have the meanings given for formula I and II. Free OH or NHR groups can advantageously be provided with a protecting group $P_G$, for example a tetrahydropyranyl ether, to avoid undesired side-reactions. The starting materials of formulae IV and V are initially charged in a polar aprotic solvent, for example dimethylformamide, hexamethylphosphoramide, dimethylpropyleneurea (DMPU), preferably dimethylformamide, admixed with a mixture of a strong base and the conjugate weak acid, where the molar ratio of base to acid is from 4:1 to 1:1, preferably from 2:1 to 1:1, particularly preferably 3:2, and the mixture is heated for from 10 minutes to 3 days, preferably from 30 minutes to 48 hours, at a temperature between 20° and 160° C., preferably from 80° to 120° C. After cooling, the reaction mixture is adjusted to a pH of between 5 and 8, preferably between 6 and 7, and worked up by methods familiar to those skilled in the art. Possible acid-base pairs are, for example, alcohols/alkoxides, such as t-butanol/t-butoxide, t-pentanol/t-pentoxide or dimethyl sulfoxide/sodium or potassium dimethyl sulfoxide salts, preference being given to the mixture alcohol/alkoxide, and particularly preference to a mixture of t-butanol and potassium t-butoxide.

Scheme 1 shows an example of the synthesis of a compound of formula I.

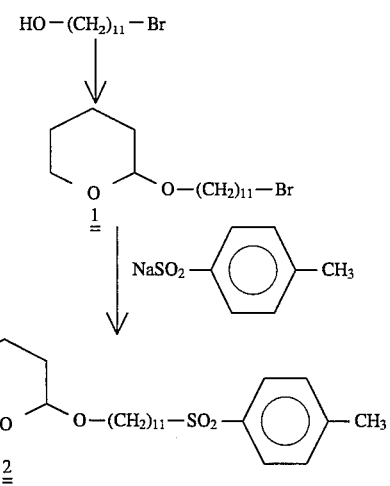

Scheme 1

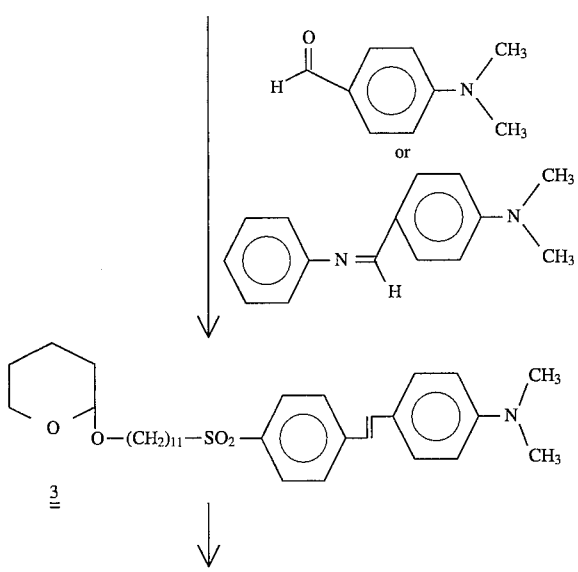

The protection of the OH group as the tetrahydropyranyl ether and the subsequent cleavage carried out by standard methods; see for example T. J. Green, Protective Groups in Organic Synthesis, Wiley, New York 1981. The alkylation of sulfinate salts can be found, for example, in Vennstra, G. E., Zwaneburg, B., Synthesis (1975) 519; Wildeman, J., van Leusen, A. M, Synthesis (1979) 733 and Bram, G., Loupy, A., Roux-Schmitt, M. C., Sansoulet, J., Strzalko, T., and Seyden-Penne, J., Synthesis (1987) 56.

Scheme 2 analogously shows the synthesis of two compounds of formula 11:

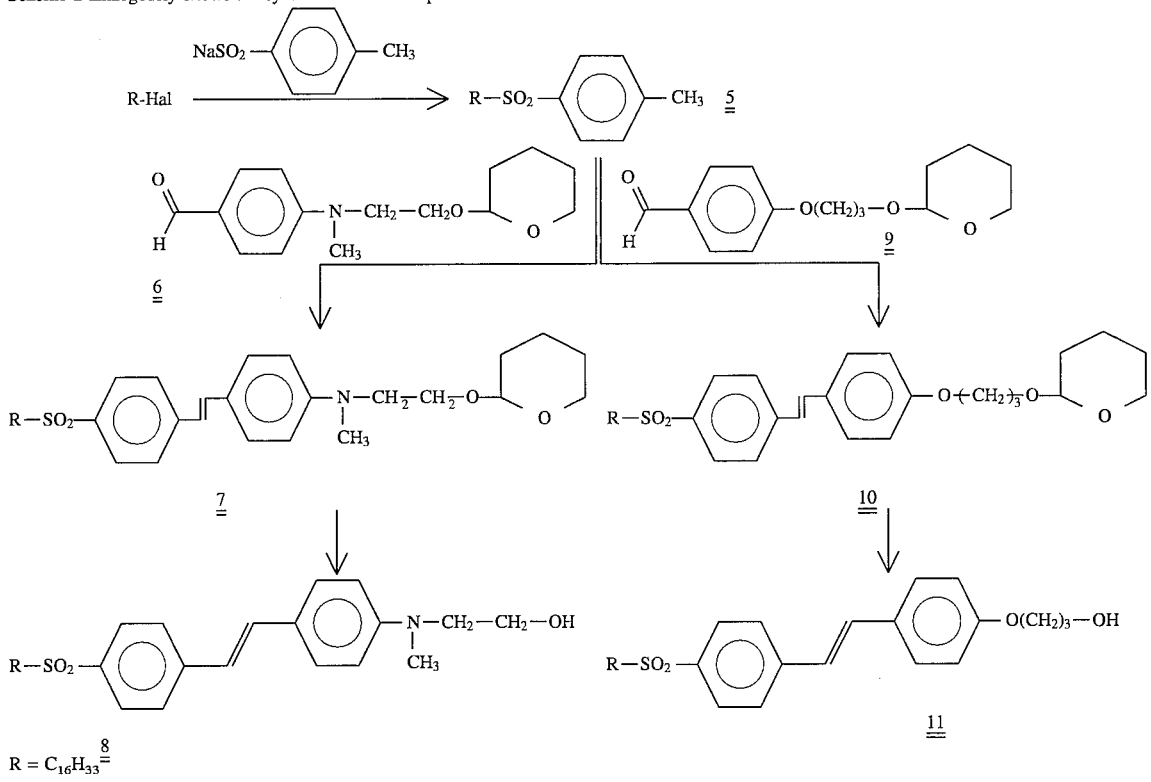

The preparation of polymers having structural units of formula I or II can be carried out by various methods. For example the compounds of formula I and II can be reacted with acrylic acid derivatives, such as acryloyl halides, to form monomeric acrylic esters and these can subsequently be polymerized by standard methods (see for example F. U. Bittmeyer, Textbook of Polymer Science, 3rd edition, p. 49 ff., New York 1984) with addition of a free-radical initiator such as azobisisobutyronitrile.

In another preferred method of preparation the starting materials are polymeric acrylic acid derivatives, such as acryloyl halides, and these are reacted in an inert solvent in the presence of a base with compounds of formula I or II and the residual acid-derivative functions of the polymer are saturated with a long-chain, preferably $C_8$–$C_{30}$ amine and/or alcohol, where any final remaining acid halide functions are reacted with a short-chain alcohol.

The polyacrylic acid derivatives used, such as polyacryloyl chlorides, preferably have a molecular weight ($M_w$) of from 10,000 to 100,000, preferably from 15,000 to 50,000, particularly from 20,000 to 30,000.

To produce the component of the invention, Langmuir-Blodgett (LB) films of polyacrylates containing chromophores of formula I and II are alternately applied to a support. The formation of LB films can be by standard methods, such as are described, for example, in A. Ulmann, An Introduction to Ultrathin Organic Films, Chap. 2, Academic Press, London 1991.

For producing the active/active films of the invention, the amphiphilic compounds are advantageously applied to the surface (spread) with a Langmuir,Blodgett film balance in a highly volatile solvent such as dichloromethane and chloroform, preferably chloroform. The dimensions of the surface, the volume spread and the concentration of the solution enable the average area per molecule to be calculated. Phase transitions during the compression of the molecules can be followed by the force-area isotherms. The molecules are pushed together by means of a barrier or by other techniques, for example using hydrodynamic forces, during which with increasing closeness the chains are oriented essentially perpendicular to the boundary layer. During compression, self-organization of the molecules in the boundary layer produces a highly ordered monomolecular film the constant thickness of which is determined by the chain length of the molecules. The typical thickness of such a film is preferably between 2 and 5 nm.

The production of alternating layers can be carried out with a so called AB trough which is divided by a fixed barrier. A film may be prepared independently on each of the two halves of the trough. The two halves of the trough are connected to one another by a dipping basin. For applying alternating coatings the substrate is dipped with a film lift through layer A and on the upstroke through layer B or vice versa.

Application of one double layer of polymers of formula III already gives optical components with advantageous nonlinear optical properties. Preference is however given to producing components with films made up of from 2 to 1000 double layers, preferably from 50 to 500, particularly preferably from 100 to 300.

Suitable supports are basically all solids having clean fat-free surfaces, for example glass, ceramic or metal sheets, plastic layers of, for example, PMMA, polystyrene, polycarbonate, polyethylene, polypropylene or polytetrafluoroethylene or even metal layers on the substrates named.

For characterization of the alternating LB layers with respect to their second-order NLO properties the frequency doubling is measured with a Maker Fringe Apparatus (P. D. Maker et al., Phys. Rev. Lett. 8, 21 (1962)). In this a p-polarized Nd-YAG laser beam impinges on the surface to be examined. The p-polarized frequency-doubled light intensity is measured as a function of the angle of incidence of the laser beam. The maximum SHG (Second Harmonic Generation) intensity is determined from this. If the orientation of the chromophores in the alternating multilayer is independent of the layer thickness the SHG intensity increases with the square of the number of dye layers. Fitting a theoretical curve (as in J. E. Sipe, J. Opt. Am.B, 4,4 (1987) 481) to the measured values enables $X^{(2)}$ to be determined. If the measured curve is symmetric about vertical incidence of the laser the chromophores in the dye layer are inclined relative to the substrate plane by the average tilt angle $\alpha$. The distribution is isotropic in the substrate plane.

The films of the invention comprise stable multilayers having good nonlinear optical properties. They are therefore suitable, for example, for electro-optical switches, diode-laser frequency doublers or optical parametric amplifiers, for example as so-called fresheners for weak light signals in optical signal transmission networks.

The following descriptions and corresponding diagrams illustrate possible forms of the claimed component without limiting it in any way.

Figure 3:
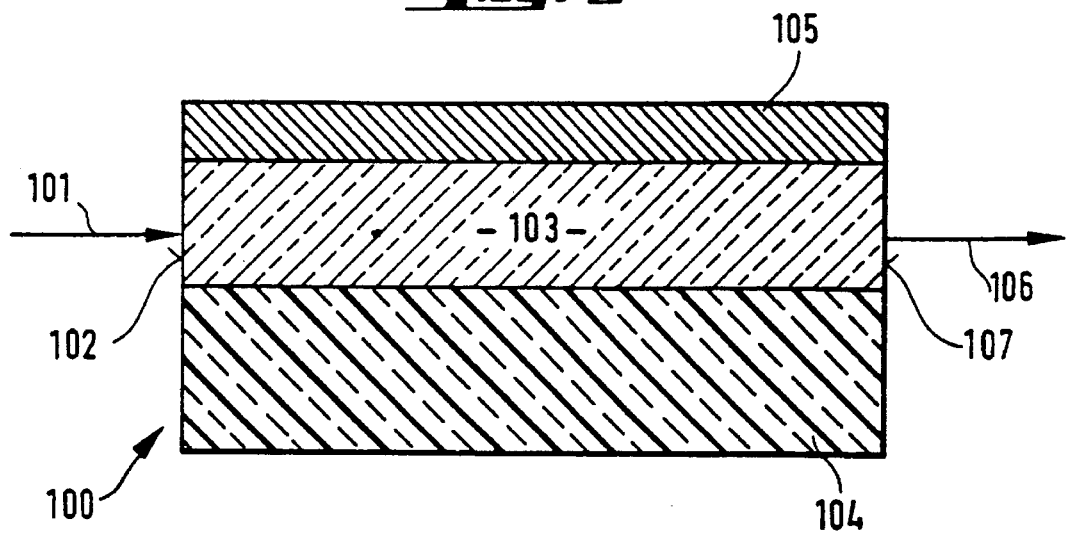
FIG. 3 illustrates a component for the frequency doubling of a lightwave.

FIG. 3 shows a component for frequency doubling of a light wave.

Figure 4:
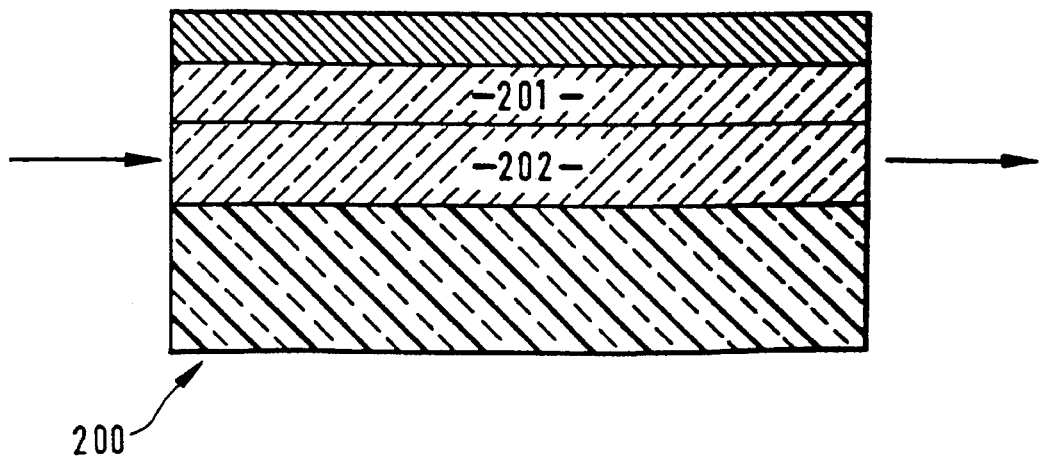
FIG. 4 shows an alternative embodiment of a frequency doubler.

FIG. 4 shows an alternative embodiment of a frequency doubler.

FIG. 5 shows a component for modulating a light wave by means of the linear electro-optical effect.

FIG. 6 shows a component for mixing and shifting light frequencies.

Component 100 (FIG. 3) enables harmonic radiation to be produced at double the frequency of the input light 101, where the light can be input either via the face 102 as in the diagram or alternatively via a prism or a grating, The active layer 103, which comprises an active-active alternating multilayer according to the invention or contains this, has a higher refractive index than the substrate 104 or the covering layer 105 and is therefore a lightwave conductor. Alternatively, air instead of the covering layer may be above the active layer. Furthermore the active layer can be structured laterally so that a two-dimensional wave conductor is produced. If the component is constructed according to the requirements of the invention, part of the incident light is converted into light of doubled frequency. This frequency-doubled light 106 can be output via the face 107 or via a prism or a grating. In FIG. 3 the wave conductor is constructed in such a way that the phase velocity of the harmonic wave in the wave conductor is the same as the phase velocity of the input base wave. In an alternative embodiment the wave conductor is constructed in such a way that the input base wave is conducted in the wave conductor but the harmonic wave is output into .the substrate in accordance with the so called Cherenkov principle.

(FIG. 4) is an alternative embodiment of the above-described component in which the wave conductor is a hybrid system comprising a nonactive part 201 and the active-active multilayer 202 of the invention.

FIG. 5 shows component 300 for light wave modulation. The incident light 301 is input into the face 302 or via a prism or grating into the active wave-conducting layer 303. The layer 303 is laterally structured as a Mach-Zehnder interferometer (W. Groh et al. Angew. Chem. Adv. Mater. 101 (1989) 366). In one arm of the interferometer, electrodes 304 are applied below and above or on both sides of the wave conductor. If a potential is applied the refractive index is changed by the linear electro-optical effect and therefore the phase velocity of the light in one arm of the interferometer is changed with respect to the other arm. Hence the constructive or destructive superposition of the two waves is affected by application of the potential and the light output via the face 305 is intensity-modulated.

The component 400 (FIG. 6) enables by means of the interaction between a light beam of frequency w1 and a second of frequency w2 the production of a new light beam whose frequency is the sum and/or difference of w3 and w4. The beams of frequencies w1 (401) and w2 (402) are input via the face 403 or via a prism or grating into a wave conductor structure 404 which either, as in FIG. 3, comprises the active-active multilayers of the invention or, as in FIG. 4, contains these. This wave conductor may also be structured laterally and thus form a two-dimensional wave conductor. By means of the nonlinear optical interaction in the multilayer of the invention the frequencies w1 and w2 are mixed, i.e. part of the input intensity is converted into frequencies which correspond to the sum or difference of the frequencies w1 and w2. These frequencies 405 and 406 can be output via the face 407 or alternatively via a prism or a grating.

The following examples illustrate the invention without limiting it in any way.

EXAMPLE 1

ω-Bromotetrahydropyranyloxyalkanes 1a) 3-Bromo-1-tetrahydropyranyloxypropane 13.9 g (0.1 mol) of 3-bromopropan-1-ol are mixed with 400 ml of dry dichloromethane and 45.7 ml (0.5 mol) of dihydropyran are added. While stirring and if needed cooling in an ice bath 190 mg (1 mmol) of p-toluenesulfonic acid monohydrate are added in such a way that the temperature of the reaction solution does not exceed 25° C. Subsequently the reaction mixture is left for 2 hours at room temperature and extracted with half-saturated aqueous sodium hydrogen carbonate solution, the dichloromethane phase is washed twice with water, dried with magnesium sulfate and filtered to remove the drying agent and the solvent is distilled off in vacuo. The remaining oil is fractionally distilled in vacuo via a 20 cm Vigreux column. 14.2–16.4 g (65–75%) of colorless oil are obtained, which boils at from 60° to 65° C. (0.5–1 mbar).

IR (film) [cm$^{-1}$]: 3500 (very weak), 2990, 2980, 2970, 2880, 2860, 2800, 2740, 2660, 1470, 1455, 1360, 1330, 1290, 1265, 1210, 1190, 1145, 1125, 1085, 1050, 1035, 995, 880, 820.

$^1$H-NMR (100 MHz; D-trichloromethane): δ[ppm]= 1.36–1.89 (m, 6H); 1.99 (m, 2H); 3.40–3.63 (m, 4H); 3.74–3.99 (m, 2H); 4.58 (m, 1H).

1b) 11-Bromo-1-tetrahydropyranyloxyundecane 25.1 g (0.1 mol) of 11-bromoundecan-1-ol are reacted as in Example 1a. The components volatile at up to 50° C. (0.5 mbar) are striped off from the crude product. The oily pale yellow residue (23 g, 70%) can be reacted without further purification.

$^1$H-NMR (100 MHz; D-trichloromethane): δ [ppm]= 1.16–2.0 (m, 26 H); 3.24–4.01 (m, 6H); 4.55 (m, 1H).

1c) 2-Bromo-1-tetrahydropyranyloxyethane

As in Example 1a, 12.46 g (7.07 ml, 0.1 mol) of 2-bromoethanol give after distillation 16.35 g (80%) of practically colorless oil (b.p.: about 50° C./1 mbar).

$^1$H-NMR (100 MHz; D-trichloromethane): δ [ppm]= 1.38–1.98 (m, 6H); 3.38–4.15 (m, 6H); 4.68 (m, 1H).

1d) 8-Chloro-3,6-dioxa-1-tetrahydropyranyloxyoctane

As in Example 1a, 16.8 g (14.48 ml, 0.1 mol) of 8-chloro-3,6-dioxaoctan-1-ol (triethyleneglycolmonochlorohydrin) give 20.8 g (83%) of a pale yellow liquid.

$^1$H-NMR (100 MHz; D-trichloromethane): δ [ppm]= 1.40–1.93 (m, 6H); 3.46–3.99 (m, 16H), 4.62 (m, 1H).

EXAMPLE 2

4-Alkylsulfonyltoluenes 2a) 3-(4-Methylphenyl)sulfonyl-1-tetrahydropyranyloxypropane 32 g (144 mmol) of 3-bromo-1-tetrahydropyranyloxypropane (1a) are dissolved in 200 ml of 1,2-dimethoxyethane, 26.9 g (151 mmol) of anhydrous sodium 4-methylphenylsulfinate, 4.5 g (14 mmol) of tetrabutylammoniumbromide and 1.05 g (7 mmol) of sodium iodide are added and the mixture is heated to boiling for 24 hours. After cooling, 500 ml of water are added, the mixture is extracted with three times 300 ml of dichloromethane each time, the combined dichloromethane extracts are washed with water and dried with magnesium sulfate. After filtering off the drying agent and distilling off the solvent in vacuo a yellowish brown oil is obtained which is purified by column chromatography (silica gel; dichloromethane or dichloromethane/ethyl acetate mixtures). 32.5 g (76%) of a colorless oil are isolated, which partly crystallizes on prolonged standing (m.p.<30° C.)

IR (film) [cm$^{-1}$]: 3080, 2960, 2900, 2770, 1935, 1825, 1610, 1470, 1455, 1315, 1150, 1090, 1040, 1000, 830.

$^1$H-NMR (100 MHz; D-trichloromethane): δ [ppm]= 1.38–2.13 (m, 8H); 2.31 (s, 3H); 3.10–3.33 (m, 2H); 3.37–3.56 (m, 2H); 3.63–3.89 (m, 2H); 7.34–7.79 (AA'XX').

2b) 11-(4-Methylphenyl)sulfonyl-1-tetrahydropyranyloxyundecane

As in Example 2a 13.57 g (40.5 mmol) of 1b give, after column chromatography, 13.82 g (83%) of practically colorless oil.

IR (film) [cm$^{-1}$]: 3090, 3060, 2960, 2880, 2760, 1610, 1480, 1465, 1455, 1330, 1315, 1300, 1155, 1105, 1090, 1045, 830.

$^1$H-NMR (100 MHz; D-trichloromethane): δ [ppm]= 1.11–1.81 (m, 24 H); 2.45 (s, 3H); 2.95–3.15 (m, 2H); 3.30–3.85 (m, 4H); 4.56 (m, 1H); 7.35–7.78 (AA'XX').

2c) 2-(4-Methylphenyl)sulfonyl-1-tetrahydropyranyloxyethane 15.38 g (75 mmol) of bromo compound 1c are reacted as in Example 2a but without addition of potassium iodide. After column chromatography 11.35 g (53%) of colorless oil are obtained.

IR (film) [cm$^{-1}$]: 3060, 2950, 2880, 2740, 1600, 1495, 1475, 1455, 1440, 1320, 128.5, 1185, 1080, 1030, 815, 725.

$^1$H-NMR (100 MHz; D-trichloromethane): δ [ppm]= 1.25–1.81 (m, 6H); 2.43 (s, 3H); 3.33–4.15 (m, 6H), 4.46 (m, 7.34, 7.81 (AA'XX').

2d) 8-(4-Methylphenyl)sulfonyl-3,6-dioxa-1-tetrahydropyranyloxyoctane 25.2 g (0.1 mol) of chloro compound 1d give as in Example 2a, after 48 hours' reaction time, 16.6 g (45%) of colorless oil.

IR (film) [cm$^{-1}$]: 3080, 3060, 2960, 2890, 2750, 1735, 1655, 1605, 1500, 1460, 1450, 1325, 1300, 1150, 1130, 1090, 1040, 825, 740.

$^1$H-NMR (100 MHz; D-trichloromethane): δ [ppm]= 1.39–1.88 (m, 6H); 2.43 (s, 3H); 3.30–3.94 (m, 14H); 4.58 (m, 1H); 7.33, 7.79 (AA'XX').

EXAMPLE 4

Stilbenes 3a) 4-dimethylamino-4'-[(3-tetrahydropyranoyloxy)-1-propylsulfonyl]stilbene Under a nitrogen atmosphere 5.96 g (20 mmol) of 2a and 3.28 g (22 mmol) of 4-dimethylaminobenzaldehyde are dissolved in 100 ml of dry dimethylformamide. After addition of 3 ml (31.6 mmol) of t-butanol and 4.48 g (40 mmol) of potassium t-butoxide the reaction mixture is heated at 120° C. for 30 hours. 400 ml of water are added to the cooled solution and the solution is acidified with saturated potassium dihydrogen phosphate solution to a pH of 6–7. The aqueous suspension is then extracted five times with ethyl acetate, and the combined extracts are washed three times with water and dried with sodium sulfate. After distilling off the solvent in vacuo a brown oily residue (9.2 g) remains. Further purification is by column chromatography [silica gel; dichloromethane or dichloromethane/ethyl acetate (50:1) or 2-methylpentane/ethyl acetate mixtures]. A total of 4.73 g (55%) of a yellow greasy material is isolated, which can be further reacted in this form.

IR (dichloromethane solution) [cm$^{-1}$]: 3030, 2980, 2930, 2890, 2860, 1600, 1580, 1515, 1430, 1415, 1355, 1305, 1270, 1250, 1140, 1030, 890.

$^1$H-NMR (360 MHz; D-trichloromethane): δ [ppm]= 1.45–1.63 (m, 6H); 1.93–2.07 (m, 2H); 3.007 (s, 6H); 3.14–3.30 (m, 2H); 3.40–3.50 (m, 2H); 3.72–3.82 (m, 2H); 4.51 (m, 1H); CH=CH: 6.910, 7.182 (AB spectrum, $^3J_{AB}$= 16.24 Hz) Aromatic signals: 6.71, 7.43 and 7.60, 7.83 (each AA'XX').

3b) 4-Dimethylamino-4'-[(11-tetrahydropyranyloxy)-1-undecylsulfonyl]stilbene

As in Example 3a 2.40 g (5.87 mmol) of 2b give, after column chromatography [silica gel; dichloromethane/ethyl acetate mixtures], 1.78 g (57%) of yellow oil.

$^1$H-NMR (1000 MHz; D-trichloromethane): δ [ppm]= 1.11–1.94 (m, 24H); 1.93–2.07 (m, 2H); 2.99 (s, 6H); 3.20–3.99 (m, 6H); 4.54 (m, 1H); CH=CH: 6.89, 7.20 (AB spectrum, $^3J_{AB}$=16.3 Hz) Aromatic signals: 6.69, 7.41 and 7.59, 7.81 (each AA'XX').

3c) 4-(Bishexadecyl)amino-4'-[(3-tetrahydropyranyloxy)-1-propylsulfonyl]stilbene As in Example 3a 2.98 g (10 mmol) of 2a and 5.70 g (10 mmol) of bishexadecylaminobenzaldehyde give, after column chromatography [silica gel; dichloromethane/ethyl acetate mixtures), 2.63 g (32%) of yellow oil.

$^1$H-NMR (300 MHz; D-trichloromethane): δ [ppm]= 0.84–0.91 (t, 6H); 1.20–1.36 (m, 54H); 1.44–1.80 (m, 12H); 1.95–2.07 (m, 2H); 3.17–3.34 (m, 2H); 3.71–3.82 (m, 2H); 4.51 (m, 1H) CH=CH: 6.865, 7.164 (AB spectrum, $^3J_{AB}$=16 Hz) Aromatic signals: 6.62, 7.39 and 7.59, 7.82 (each AA'XX').

3d) 1-(N-Ethylcarbazol-3-yl)-2-[4-(3-tetrahydropyranyloxy)-1-propylsulfonylphenyl]ethene As in Example 3a 2.98 g (10 mmol) of 2a and 2.68 g (12 mmol) of N-ethylcarbazole-3-carboxaldehyde give, after column chromatography. [silica gel; dichloromethane/ethyl acetate mixtures], 1.56 g (31%) of yellow oil.

$^1$H-NMR [100 MHz; D-trichloromethane]: δ [ppm]= 1.30–2.15 (t and m, overlapping, 13H); 3.10–3.58 (m, 4H); 3.63–3.90 (m, 2H); 4.35 (q, overlapping, 2H); 4.49 (m, 1H); 7.00–8.28 (m, 13H).

3e) 4-Methoxy-4'-[(3-tetrahydropyranyloxy)-1-propylsulfonyl]stilbene

As in Example 3a 2.98 g (10 mmol) of 2a and 1.42 g (10.5 mmol) of 4-methoxybenzaldehyde give, after column chromatography[silica gel; dichloromethane/ethyl acetate mixtures], 1.78 g (43%) of colorless powder.

IR (KBr) [cm$^{-1}$]: 3090 (w), 3070 (w), 3060 (w), 3030 (w), 2950 (s), 2870 (m), 1635 (w), 1605 (s), 1590 (vs), 1515 (vs), 1310 (s), 1300 (s), 1270 (m), 1255 (vs), 1180 (s), 1140 (vs), 1120 (s), 1085 (s), 1040 (vs), 985 (vs), 975 (vs), 930 (m), 840 (s), 790 (s).

$^1$H-NMR [300 MHz; D-trichloromethane]: δ [ppm]= 1.45–1.80 (m, 6H); 1.96–2.07 (m, 2H); 3.20–3.28 (m, 2H); 3.41–3.50 (m, 2H); 3.72–3.81 (m, 2H); 3.845 (s, 3H); 4.51 (m, 1H) CH=CH: 6.990; 7.203 (AB spectrum: $^3J_{AB}$=16 Hz) Aromatic signals: 6.922; 7.485 and 7.631 (each AA'XX'). UV: $\lambda_{max}$=336 nm (trichloromethane); $\lambda_{max}$=330 nm (acetonitrile)

3f) 4-Octadecyloxy-4'-[(3-tetrahydropyranyloxy)-1-propylsulfonyl]stilbene

As in Example 9 but stirring the reaction mixture for only 2 hours at RT, 2.03 g (6.8 mmol) of 2a and 3.0 g (8 mmol) of 4-octadecyloxybenzaldehyde give, after column chromatography [ silica gel; dichloromethane/ethyl acetate mixtures ], 1.34 g (30%) of colorless powder.

$^1$H-NMR (300 MHz; D-trichloromethane ): δ [ppm]=0.88 (t, 3H); 1.24–1.60 (m, 36H); 1.95–2.06 (m, 2H); 3.18–3.30 (m, 2H); 3.41–3.51 (m, 2H); 3.71–3.81 (m, 2H); 3.983 (t, 2H); 4.51 (m, 1H) CH=CH: 6.98; 7.20 (AB spectrum, $^3J_{AB}$=16 Hz) Aromatic signals: 6.91; 7.47 and 7.63, 7.86 (each AA'XX').

3g) 4-Methoxy-4'-[(11-tetrahydropyranyloxy)-1-undecylsulfonyl]stilbene

As in Example 3a 4.1 g (10 mmol) of 2b and 1.42 g (10.5 mmol) of 4-methoxybenzaldehyde give, after column chromatography [silica gel; dichloromethane/ethyl acetate mixtures], 960 mg (18%) of pale yellow oil.

3h) 3,4-Ethylenedioxy-4'-[(3-tetrahydropyranyloxy)-1-propylsulfonyl]stilbene

As in Example 3a 2.98 g (10 mmol) of 2a and 1.65 g (11 mol) of piperonal give, after column chromatography [silica gel; dichloromethane/ethyl acetate mixtures], 1.22 g (27%) of yellow oil.

$^1$H-NMR [100 MHz; D-trichloromethane]: δ [ppm]= 13.6–1.83 (m, 6H); 1.86–2.11 (m, 2H), 3.11–3.33 (m, 2H); 3.36–3.58 (m, 2H); 3.63–3.90 (m, 2H); 4.36 (m, 1H); 5.99 (s, 2H); 6.73–7.93 (m, 9H).

3i) 4-Dibutylamino-4'-[(3-tetrahydropyranyloxy)-1-propylsulfonyl]stilbene

As described in Example 3a, 2a and dibutylaminobenzaldehyde give the hydroxy-protected stilbene 3i.

3j) 2,4,6-Trimethoxy-4'-[(3-tetrahydropyranyloxy)-1-propylsulfonyl]stilbene

As in Example 3a 2.98 g (10 mmol) of 2a and 2.16 g (11 mmol) of 2,4,6-trimethoxybenzaldehyde give, after column chromatography [silica gel; dichloromethane/ethyl acetate mixtures], 1.28 g (27%) of yellow oil.

$^1$H-NMR [100 MHz; D-trichloromethane]: δ [ppm]= 1.38–1.79 (m, 6H); 1.90–2.14 (m, 2H); 3.11–3.78 (m, 6H); 3.85 (s, 3H); 3.90 (s, 6H); 6.15 (s, 2H); 7.33–7.90 (m, 6H).

3k) 4-Methylmercapto-4'-[(3-tetrahydropyranyloxy)-1-propylsulfonyl]stilbene

As in Example 3a 5.96 g (20 mmol) of 2a and 3.64 g (24 mmol) of 4-methylmercaptobenzaldehyde after 21 hours at 120° C. give 2.55 g (29%) of pale yellow oil.

$^1$H-NMR [300 MHz; D-trichloromethane]: δ [ppm]= 1.45–1.80 (m, 6H); 1.92–2.08 (m, 2H); 2.512 (s, 3H); 3.15–3.28 (m, 2H); 3.39–3.51 (m, 2H); 3.71–3.81 (m, 2H); 4.50 (m, 1H) CH=CH: 7.075; 7.205 (AB spectrum, $^3J_{AB}$=16 Hz E-stilbene) Aromatic signals: 7.255; 7.460 and 7.645, 7.870 (each AA'XX').

EXAMPLE 4

Compounds of formula I 4a) 4-Dimethylamino-4'-[(1-hydroxy)-3-propylsulfonyl]stilbene A solution of 810 mg (1.89 mmol) of the substance from Example 3a in 15 ml of tetrahydrofuran is admixed with 3 ml of 6M hydrochloric acid and heated to boiling for 4–8 hours. As soon as monitoring by thin layer chromatography indicates that the reaction is complete, the cooled solution is brought to a pH of 6–7 with dilute sodium hydroxide solution and is then diluted with water to three times its volume. This produces a voluminous yellow precipitate which is filtered off, washed with water and dried in a vacuum desiccator over blue gel or potassium hydroxide pellets. 560 mg (86%) of pale yellow powder (m.p. 247°–249° C.) is obtained, mostly in high purity. If the material is contaminated it is recrystallized from ethyl acetate.

$^1$H-NMR (360 MHz; D$_6$-DMSO): δ [ppm]=1.63–1.73 (m, 2H); 2.939 (s, 6H); 3.23–3.32 (m, 4H); 3.415 (q, 2H); 3.60 (t, 1H) CH=CH 7.060; 7.345 (AB spectrum, $^3J_{AB}$=16.3 Hz) Aromatic signals: 6.72; 7.48 and 7.75; 7.80 (each AA'XX').

IR (KBr) [cm$^{-1}$]: 3520 (s), 3420 (s, br), 3040 (w), 2920 (s), 2840 (s), 1605 (s), 1585 (s), 1525 (m), 1465 (m), 1405 (m), 1360 (m); 1315 (s), 1295 (s), 1285 (s), 1140 (vs), 1085 (s), 970 (s), 825 (s), 600 (s), 500 (s). UV: λ$_{max}$=386 nm (trichloromethane); λ$_{max}$=380 nm (acetonitrile).

4b) 4-Dimethylamino-4'-[(1-hydroxy)-11-undecylsulfonyl]stilbene 500 mg (0.92 mmol) of the material from Example 3b are dissolved in tetrahydrofuran as described in Example 4a and treated with hydrochloric acid. 370 mg (88%) of yellow powder of m.p. 153°–155° C. are obtained.

$^1$H-NMR (300 MHz; D-trichloromethane): δ [ppm]= 1.20–1.40 (m, 12H); 1.49–1.60 (m, 4H); 1.65–1.77 (m, 2H); 3.010 (s, 6H); 3.03–3.11 (m, 2H); 3.58–3.67 (m, 2H) CH=CH 6.915; 7.188 (AB-spectrum, $^3J_{AB}$=16 Hz) Aromatic signals: 6.72; 7.44 and 7.60, 7.82 (each AA'XX')

4c) 4-(Bishexadecyl)amino-4'-[(1-hydroxy)-3-propylsulfonyl]stilbene 1.91 g (2.24 mmol) from Example 3c are treated in tetrahydrofuran with HCl as in Example 12. After neutralization the aqueous mixture is extracted a number of times with trichloromethane, the extracts are dried with sodium sulfate and the solvent distilled off in vacuo. The residue is purified by column chromatography (silica gel; dichloromethane/ethyl acetate 10:1). The greasy product is heated in a little toluene, methanol is added after cooling and the product is precipitated at −20° C. A pale yellow solid with a melting point of 55°–57° C. (1.33 g, 77%) is obtained.

$^1$H-NMR (300 MHz; D-trichloromethane ): δ [ppm]=0.88 (t, 6H); 1.18–1.38 (m, 48H); 1.24–1.36 (m, 6H); 1.95–2.06 (m, 2H); 3.19–3.34 (m, 4H); 3.72–3.79 (m, 3H) CH=CH 6.866; 7.152 (AB spectrum, $^3J_{AB}$=16 Hz) Aromatic signals: 6.64; 7.39 and 7.58; 7.82 (each AA'XX').

4d) 4-Methoxy-4'-[(1-hydroxy)-3-propylsulfonyl)stilbene

A solution of 630 mg (1.51 mmol) of the material from Example 3g in 10 ml of tetrahydrofuran is admixed with 3 ml of 2M hydrochloric acid and heated to 60° C. for 4–8 hours. As soon as monitoring by thin layer chromatography indicates that the reaction is complete, the cooled solution is brought to a pH of 6–7 with dilute sodium hydroxide solution and is then diluted with water to five times its volume. A voluminous colorless precipitate is produced which is filtered off, washed with water and dried in a vacuum desiccator over blue gel or potassium hydroxide pellets. 410 mg (82%) of gray powder are obtained and purified by column chromatography.

$^1$H-NMR (300 MHz; D-trichloromethane): δ [ppm]=1.67 (t, 1H); 1.95–2.06 (m, 2H); 3.22–3.29 (m, 2H); 3.756 (q, 2H); 3.848 (s, 3H) CH=CH: 6.980, 7.208 (AB spectrum; $^3J_{AB}$=16 Hz) Aromatic signals: 6.93, 7.49 and 7.64, 7.86 (each AA'XX').

4e) 3,4-Ethylenedioxy-4'-[(1-hydroxy)-3-propylsulfonyl]stilbene

As in Example 4a 1.22 g of the material from Example 3h gives 770 mg (78%) of practically colorless oil.

$^1$H-NMR [100 MHz; D-trichloromethane]: δ [ppm]= 1.88–2.14 (m, 2H); 3.11–3.38 (m, 2H); 3.72 (t, 2H); 6.00 (s, 2H); 6.73–7.93 (m, 9H).

4f) 1-(N-Ethylcarbazol-3-yl)-2-[4-3-hydroxy)-1-propylsulfonylphenyl]ethene

As in Example 4a 1.56 g (3.1 mmol) of the material from Example 3d gives, after column chromatography [silica gel; dichloromethane/ethyl acetate mixtures], 1.03 g (80%) of yellow oil.

$^1$H-NMR[100 MHz; D-trichloromethane]: δ [ppm]=1.40 (t, 3H); 1.83–2.25 (m, br, 3H); 3.10–3.34 (m, 2H), 3.58–3.80 (m, 2H); 4.33 (q, 2H); 6.43–8.28 (m, 13H).

4g) 4-Dibutylamino-4'-[(3-hydroxy)-1-propylsulfonyl)stilbene

As described in Example 4a acid hydrolysis of the tetrahydropyranyl ether from Example 3i gives 4 g of the hydroxy compound.

$^1$H-NMR (300 MHz; D-trichloromethane): δ [ppm]=0.96 (t, 6H); 1.23–1.43 (m, 4H); 1.49–1.69 (m, 5H); 1.94–2.06 (m, 2H); 3.20–3.34 (m, 6H); 3.71–3.78 (m, 2H) CH=CH: 6.868; 7.162 (AB spectrum, $^3J_{AB}$=16 Hz) Aromatic signals: 6.59; 7.39 and 7.59, 7.82 (each AA'XX').

4h) 4-Methylmercapto-4'-[(1-hydroxy)-3-propylsulfonyl]stilbene

As in Example 4a the material from Example 3k gives a colorless powder (60%)

$^1$H-NMR (300 MHz; D-trichloromethane ): δ [ppm]=1.69 (br, 1H); 1.95–2.05 (m, 2H); 2.51 (s, 3H); 3.22–3.29 (m, 2H); 3.75 (t, br, 2H) CH=CH: 7.020; 7,200 (AB spectrum, $^3J_{AB}$=16 Hz E-stilbene ) Aromatic signals: 7.255, 7.458 and 7.649; 7.872 (each AA'XX').

4i) From compound 2a the following are similarly obtained

I. 4-(bisoctadecyl)amino-4'-[(1-hydroxy)-3-propylsulfonyl] stilbene

II. 4-(N-ethyl-N-octadecyl)amino-4'-[(1-hydroxy)-3-propylsulfonyl]stilbene
III. 4-hexadecyloxy-4'-[(1-hydroxy)-3-propylsulfonyl]stilbene
IV. 4-tetradecyloxy-4'-[(1-hydroxy)-3-propylsulfonyl]stilbene
V. 4-docosyloxy-4'-[(1-hydroxy)-3-propylsulfonyl]stilbene
VI. 2,4-bis(octadecyloxy)-4'-[(1-hydroxy)-3-propylsulfonyl]stilbene
VII. 4-hexadecylthio-4'-[(1-hydroxy)-3-propylsulfonyl]stilbene
VIII. 4-octadecylthio-4'-[(1-hydroxy)-3-propylsulfonyl]stilbene.

4j) Using the compound from 2b similarly gives
I. 4-dibutylamino-4'-[(1-hydroxy)-11-undecylsulfonyl]stilbene
II. 4-(bisoctadecyl)amino-4'-[(1-hydroxy)-11-undecylsulfonyl]stilbene
III. 4-(N-ethyl-N-octadecyl)amino-4'-[(1-hydroxy)-11-undecylsulfonyl]stilbene
IV. 4-hexadecyloxy-4'-[(1-hydroxy)-11-undecylsulfonyl]stilbene
V. 4-tetradecyloxy-4'-[(1-hydroxy)-11-undecylsulfonyl]stilbene
VI. 4-docosyloxy-4'-[(1-hydroxy)-11-undecylsulfonyl]stilbene
VII. 2,4-bis(octadecyloxy)-4'-[(1-hydroxy)-11-undecylsulfonyl]stilbene
VIII. 4-hexadecylthio-4'-[(1-hydroxy)-11-undecylsulfonyl]stilbene
IX. 4-octadecylthio-4'-[(1-hydroxy)-11-undecylsulfonyl]stilbene.

4k) As described in Examples 1a and 2a 4-chloro-1-butanol gives 4-(4-methylphenyl)sulfonyl-1-tetrahydropyranyloxybutane. Using this compound similarly gives:
I. 4-dibutylamino-4'-[(1-hydroxy)-4-butylsulfonyl]stilbene
II. 4-(bishexadecyl)amino-4'-[(1-hydroxy)-4-butylsulfonyl]stilbene
III. 4-(bisoctadecyl)amino-4'-[(1-hydroxy)-4-butylsulfonyl]stilbene
IV. 4-(N-ethyl-N-octadecyl)amino-4'-[(1-hydroxy)-4-butylsulfonyl]stilbene
V. 4-hexadecyloxy-4'-[(1-hydroxy)-4-butylsulfonyl]stilbene
VI. 4-octadecyloxy-4'-[(1-hydroxy)-4-butylsulfonyl]stilbene
VII. 4-tetradecyloxy-4'-[(1-hydroxy)-4-butylsulfonyl]stilbene
VIII. 4-docosyloxy-4'-[(1-hydroxy)-4-butylsulfonyl]stilbene
IX. 2,4-bis(octadecyloxy)-4'-[(1-hydroxy)-4-butylsulfonyl]stilbene
X. 4-hexadecylthio-4'-[(1-hydroxy)-6-hexylsulfonyl]stilbene
XI. 4-octadecylthio-4'-[(1-hydroxy)-4-butylsulfonyl]stilbene.

4l) As described in Examples 1a and 2a 6-chloro- or 6-bromo-1-hexanol gives 6-(4-methylphenyl)sulfonyl-1-tetrahydropyranyloxyhexane. Using this compound similarly gives:
I. 4-dibutylamino-4'-[(1-hydroxy)-6-hexylsulfonyl]stilbene
II. 4-(bishexadecyl)amino-4'-[(1-hydroxy)-6-hexylsulfonyl]stilbene
III. 4-(bisoctadecyl)amino-4'-[(1-hydroxy)-6-hexylsulfonyl]stilbene
IV. 4-(N-ethyl-N-octadecyl)amino-4'-[(1-hydroxy)-6-hexylsulfonyl]stilbene
V. 4-hexadecyloxy-4'-[(1-hydroxy)-6-hexylsulfonyl]stilbene
VI. 4-octadecyloxy-4'-[(1-hydroxy)-6-hexylsulfonyl]stilbene
VII. 4-tetradecyloxy-4'-[(1-hydroxy)-6-hexylsulfonyl]stilbene
VIII. 4-docosyloxy-4'-[(1-hydroxy)-6-hexylsulfonyl]stilbene
IX. 2,4-bis(octadecyloxy)-4'-[(1-hydroxy)-6-hexylsulfonyl]stilbene
X. 4-hexadecylthio-4'-[(1-hydroxy)-6-hexylsulfonyl]stilbene
XI. 4-octadecylthio-4'-[(1-hydroxy)-6-hexylsulfonyl]stilbene.

4m) As described in Examples 1a and 2a 8-bromo- or 8-chloro-1-octanol gives 8-(4-methylphenyl)sulfonyl-1-tetrahydropyranyloxyoctane. Using this compound similarly gives:
I. 4-dibutylamino-4'-[(1-hydroxy)-8-octylsulfonyl]stilbene
II. 4-(bishexadecyl)amino-4'-[(1-hydroxy)-8-octylsulfonyl]stilbene
III. 4-(bisoctadecyl)amino-4'-[(1-hydroxy)-8-octylsulfonyl]stilbene
IV. 4-(N-ethyl-N-octadecyl)amino-4'-[(1-hydroxy)-8-octylsulfonyl]stilbene
V. 4-hexadecyloxy-4'-[(1-hydroxy)-8-octylsulfonyl]stilbene
VI. 4-octadecyloxy-4'-[(1-hydroxy)-8-octylsulfonyl]stilbene
VII. 4-tetradecyloxy-4'-[(1-hydroxy)-8-octylsulfonyl]stilbene
VIII. 4-docosyloxy-4'-[(1-hydroxy)-8-octylsulfonyl]stilbene
IX. 2,4-bis(octadecyloxy)-4'-[(1-hydroxy)-8-octylsulfonyl]stilbene
X. 4-hexadecylthio-4'-[(1-hydroxy)-8-octylsulfonyl]stilbene
XI. 4-octadecylthio-4'-[(1-hydroxy)-8-octylsulfonyl]stilbene.

4n) As described in Examples 1a and 2a 12-bromo-1-dodecanol gives 12-(4-methylphenyl)sulfonyl-1-tetrahydropyranyloxydodecane. Using this compound similarly gives:
I. 4-dibutylamino-4'-[(1-hydroxy)-12-dodecylsulfonyl]stilbene
II. 4-(bishexadecyl)amino-4'-[(1-hydroxy)-12-dodecylsulfonyl]stilbene
III. 4-(bisoctadecyl)amino-4'-[(1-hydroxy)-12-dodecylsulfonyl]stilbene
IV. 4-(N-ethyl-N-octadecyl)amino-4'-[(1-hydroxy)-12-dodecylsulfonyl]stilbene
V. 4-hexadecyloxy-4'-[(1-hydroxy)-12-dodecylsulfonyl]stilbene
VI. 4-octadecyloxy-4'-[(1-hydroxy)-12-dodecylsulfonyl]stilbene
VII. 4-tetradecyloxy-4'-[(1-hydroxy-12-dodecylsulfonyl]stilbene
VIII. 4-docosyloxy-4'-[(1-hydroxy)-12-dodecylsulfonyl]stilbene
IX. 2,4-bis(octadecyloxy)-4'-[(1-hydroxy)-12-dodecylsulfonyl]stilbene
X. 4-hexadecylthio-4'-[(1-hydroxy)-12-dodecylsulfonyl]stilbene
XI. 4-octadecylthio-4'-[(1-hydroxy)-12-dodecylsulfonyl]stilbene.

4o) 4-octadecyloxy-4'-[(3-hydroxy)-1-propylsulfonyl]stilbene 9.02 g (13.8 mmol) of 3i are dissolved in 140 ml of tetrahydrofuran. After addition of 100 ml of 2M hydrochloric acid the mixture is heated at 50° C. for 4 hours. The mixture becomes turbid and on cooling a colorless precipitate separates, which is filtered off and first washed with a little THF and then with water. The solid is dried in a vacuum desiccator. 4.50 g of colorless powder of m.p. 137° C. are obtained. The mother liquor is concentrated, extracted a number of times with dichloromethane, the extracts are dried with magnesium sulfate, the solvent distilled off and the resulting oily residue is chromatographed with isohexane/acetic ester mixtures on a silica gel column. A total of 5.90 g (75%) of product are isolated.

$^1$H-NMR (300 MHz; D-trichloromethane); δ [ppm]=0.88 (t, 3H), 1.24–1.50 (m, 30H); 1.75–1.85 (m, 2H); 1.95–2.05 (m, 2H); 3.22–3.29 (m, 2H); 3.76 (q, 2H); 3.985 (t, 2H) CH=CH 6.98; 7.20 (AB spectrum, $^3J_{AB}$=16 Hz) Aromatic signals: 6.91; 7.47 and 7.63; 7.86 (each AA'XX').

EXAMPLE 5

Sulfones

5a) Hexadecyl tolyl sulfone

As in Example 2a, 9.15 g (30 mmol) of 1-bromohexadecane and 5.88 g (33 mmol) of sodium p-toluenesulfinate (anhydrous) are reacted. After chromatography on a short silica gel column (dichloromethane/ethyl acetate 10:1) 10.7 g (94%) of 5a are obtained.

$^1$H-NMR (100 MHz; D-trichloromethane): δ [ppm]=0.96 (t, 3H); 1.20–1.29 (s, br, 26H); 1.50–1.88 (m, 2H); 2.44 (s, H); 2.93–3.15 (m, 2H); 7.23; 7.78 (AA'XX', 4H).

5b) As in 5a from 1-bromobutane: butyl tolyl sulfone

5c) As in Example 5a from 1-bromohexane: hexyl tolyl sulfone

5d) As in Example 5a from 1-bromooctane: octyl tolyl sulfone

5e) As in Example 5a from 1-bromodecane: decyl tolyl sulfone

5f) As in Example 5a from 1-bromododecane: dodecyl tolyl sulfone

5g) As in Example 5a from 1-bromotetradecane: tetradecyl tolyl sulfone

5h) As in Example 5a from 1-bromooctadecane: octadecyl tolyl sulfone

EXAMPLE 6

4-[N-Methyl-N-2-(tetrahydropyranyloxy)ethylamino]benzaldehyde

As in Example 1 3.58 g (20 mmol) of 4-(N-methyl-N-hydroxyethylamino)benzaldehyde are reacted with 0.1 mol of tetrahydropyran and 1 mmol of p-toluenesulfonic acid to give the tetrahydropyranyl ether,. The crude product is purified by column chromatography [silica gel; dichloromethane/ethyl acetate 50:1). 4.71 g (90%) of yellow oil are obtained.

$^1$H-NMR (100 MHz; D-trichloromethane): δ [ppm]= 1.27–1.93 (m, 6H); 3.02 (s, 3H); 3.23–3.91 (m, 6H); 4.48 (m, 1H); 6.68, 7.63 (AA'XX', 4H); 9.64 (s, 1H)

EXAMPLE 7

4-[N-Methyl-N-2-(tetrahydropyranyloxy)ethylamino]-4'-hexadecylsulfonylstilbene

As in Example 5a 3.8 g (10 mmol) of 5a and 2.62 g (10 mmol) of the material from Example 6 give, after column chromatography [silica gel; dichloromethane], 1.15 g (18%) of 7 as yellow-brown oil.

$^1$H-NMR (300 MHz; D-trichloromethane): δ [ppm]=0.87 (t, 3H); 1.20–1.85 (m, 34H); 3.04–3.10 (m, overlapping, 2H); 3.05 (s, 3H); 3.42–3.66 (m, 4H); 3.76–3.94 (m, 2H); 4.58 (m, 1H) CH=CH: 6.90; 7.18 (AB spectrum, $^3J_{AB}$=16 Hz) Aromatic signals: 6.73; 7.41 and 7.59; 7.81 (each AA'XX').

EXAMPLE 8

8) 4-[N-Methyl-N-2-hydroxyethylamino]-4'-hexadecylsulfonylstilbene

As in Example 4a the material from Example 7 after cleavage of the tetrahydropyranyl ether gives the hydroxy compound 8a.

The following are obtained in a similar manner:
b) 4-[N-methyl-N-2-hydroxyethylamino]-4'-dodecylsulfonylstilbene
c) 4-[N-methyl-N-2-hydroxyethylamino]-4'-tetradecylsulfonylstilbene
d) 4-[N-methyl-N-2-hydroxyethylamino]-4'-octadecylsulfonylstilbene
e) 4-[N-methyl-N-2-hydroxyethylamino]-4'-butylsulfonylstilbene
f) 4-[N-methyl-N-2-hydroxyethylamino]-4'-hexylsulfonylstilbene
g) 4-[N-methyl-N-2-hydroxyethylamino-4'-octylsulfonylstilbene
h) 4-[N-methyl-N-2-hydroxyethylamino]-4'-decylsulfonylstilbene.

EXAMPLE 9

4-[3-(Tetrahydropyranyloxy)propoxy]benzaldehyde

In accordance with literature directions 4-hydroxybenzaldehyde is reacted with the bromo compound 2a in the presence of a phase transfer catalyst (dichloromethane/sodium hydroxide solution/tetra-n-butylammonium hydroxide). After chromatographic purification the aldehyde is obtained as a pale yellow oil.

EXAMPLE 10

4-[3-(Tetrahydropyranyloxy)propoxy]-4'-hexadecylsulfonylstilbene

As described in Examples 7a and b the tolyl component 5 and the aldehyde 9, after column chromatography, give the stilbene.

EXAMPLE 11

11a) 4-[3-Hydroxypropoxy]-4'-hexadecylsulfonylstilbene

Cleavage of the tetrahydropyranyl ether is carried out as described in Example 4a. The hydroxy compound is obtained.

The following are prepared in a similar manner:
11b) 4-[3-hydroxypropoxy]-4'-decylsulfonylstilbene
11c) 4-[3-hydroxypropoxy]-4'-butylsulfonylstilbene
11d) 4-[3-hydroxypropoxy]-4'-hexylsulfonylstilbene
11e) 4-[3-hydroxypropoxy]-4'-octylsulfonylstilbene
11f) 4-[3-hydroxypropoxy]-4'-octadecylsulfonylstilbene
11g) 4-[3-hydroxypropoxy]-4'-dodecylsulfonylstilbene
11h) 4-[3-hydroxypropoxy]-4'-tetradecylsulfonylstilbene.

EXAMPLE 12

Unsaturated Systems with Thiophene Rings 12a) 1-[(5-Dibutylamino)thien-2-yl)]-2-[4-[(3-tetrahydropyranyloxy)-1-propylsulfonyl]phenyl-(E)-ethene As in Example 3a 5.96 g (20 mmol) of 2a are reacted with 5.27 g (22 mmol) of 5-dibutylaminothiophene-2-carbaldehyde. After column chromatography 3.07 g (32%) of red-orange oil are obtained.

$^1$H-NMR (300 MHz; D-trichloromethane) δ [ppm]=0.96 (t, 6H); 1.34–1.67 (m, 14H); 1.93–2.07 (m, 2H); 3.14–3.32 (m, 6H); 3.40–3.50 (m, 2H); 3.72–3.82 (m, 2H); 4.51 (m, 1H) CH=CH 6.40; 7.23 (AB spectrum, $^3J_{AB}$=16 Hz) Aromatic signals: 7.60; 7.83 (AA'XX', phenylene unit) 5.72; 6.84 (each d, per 1 H, thienyl unit)

12b) 1-[(5-Dibutylamino)thien-2-yl)]-2-[4-[(1-hydroxy)-4-propylsulfonyl]phenyl-(E) -ethene As in Example 4c 2.0 g (3.85 mmol) of the compound from Example 12a are heated to boiling in tetrahydrofuran with 2M hydrochloric acid. After chromatography 1.12 g (64%) of red-orange powder are obtained.

$^1$H-NMR (300 MHz; D-trichloromethane) δ [ppm]=0.96 (t, 6H); 1.38 (m, 4H); 1.66 (m, 4H); 1.71 (s, br, 1H); 1.94–2.06 (m, 2H); 3.16–3.34 (m, 6H); 3.71–3.80 (m, 2H) CH=CH: 6.39; 7.25 (AB spectrum, $^3J_{AB}$=16 Hz). Aromatic signals: 7.59; 7.82 (AA'XX', phenylene unit) 5.70; 6.85 (each d, per 1H, thienyl unit).

Reaction of sulfonyldialkylaminostilbenes as in polymers

EXAMPLE 13

Methacrylates and Acrylates 13a) 4-Dimethylamino-4'-[3-methacryloyloxy)-1-propylsulfonyl]stilbene 1.46 ml (15 mmol) of methacryloyl chloride are mixed with 10 ml of dry dioxane under a nitrogen atmosphere. After addition of 61 mg (0.5 mmol) of N,N-dimethylaminopyridine a solution of 1.06 g (3.07 mmol) of compound 4a in 20 ml of pyridine is added dropwise at room temperature over a period of 1.5 hours and the reaction mixture is stirred for a further 20 hours at room temperature. The complete suspension is then put on a silica gel column and eluted with dichloromethane/ethyl acetate (1:1). The solvent is distilled off in vacuo and the yellow oil obtained is purified by chromatography [silica gel; dichloromethane/ethyl acetate (1:1)]. 620 mg (52%) of yellow solid are obtained, and are stored under nitrogen in a refrigerator.

$^1$H-NMR (100 MHz; CDCl$_3$): δ [ppm]=1.90 (m, 3H), 2.00–2.33 (m, 2H); 3.00 (s, 6H); 3.08–3.30 (m, 2H); 4.20 (t, 2H); 5.55 (m, 1H); 6.05 (m, 1H) CH=CH (stilbene): 6.88; 7.20 (AB spectrum, $^3J_{AB}$=16.3 Hz) Aromatic signals: 6.70; 7.43 and 7.58, 7.81 (each AA'XX').

13b) 4-Octadecyloxy-4'-[3-methacryloyloxy)-1-propylsulfonyl]stilbene

Methacryloyl chloride and 4-octadecyloxy-4'-[(hydroxy)-1-propylsulfonyl]stilbene on reaction in dichloromethane in the presence of pyridine give the methacrylic ester which is purified by chromatography.

$^1$H-NMR (300 MHz, D-trichloromethane): δ [ppm]=0.88 (t, 3H); 1.24–1.50 (m, 30 H); 1.74–1.84 (m, 2H); 1.91 (m, 3H); 2.07–2.18 (m, 2H); 3.16–3.24 (m, 2H); 3.986 (t, 2H); 4.208 (t, 2H); 5.566 (m, 1H); 6.060 (m, 1H) CH=CH (stilbene): 6.982; 7.205 (AB spectrum, $^3J_{AB}$=16 Hz) Aromatic signals: 6.914; 7.470 and 7.638, 7.860 (each AA'XX').

13c) 4-Octadecyloxy-4'-[(3-acryloyloxy)-1-propylsulfonyl]stilbene

In a similar way acryloyl chloride gives the corresponding acrylate.

$^1$H-NMR (300 MHz; D-trichloromethane): δ [ppm]=0.88 (t, 3H); 1.24–1.50 (m, 30H); 1.74–1.85 (m, 2H); 2.07–2.18 (m, 2H); 3.16–3.24 (m, 2H); 3.98 (t, 2H); 4.2224 (t, 2H); 5.84 (dd, 1H, $^3J$=10.5 Hz, $^2J$=1.5 Hz); 6.08 (dd, 1H, $^3J$=17 Hz, $^3J$=10.5 Hz); 6.388 (dd, 1H, $^3J$=17 Hz, $^2J$=1.5 Hz) CH=CH (stilbene): 6.985; 7.204 (AB spectrum, $^3J_{AB}$=16 Hz) Aromatic signals: 6.913; 7.472 and 7.648; 7.862 (each AA'XX').

13d) 4-Octadecyloxy-4'-[(1-methacryloyloxy)-3-propylsulfonyl]stilbene 1 g (1.75 mmol) of 4-octadecyloxy-4'-[(1-hydroxy)-3-propylsulfonyl]stilbene is dissolved together with a small crystal of 2,6-di-t-butyl-p-cresol (inhibitor) under nitrogen and cooled to 0° C. 0.366 g (3.5 mmol) of methacryloyl chloride in 5 ml of chloroform and 277 mg of pyridine in 10 ml of chloroform are slowly added dropwise under nitrogen to this. After 1 hour at 0° C. the suspension is heated to 50° C. After a further 3 hours at 50° C. the reaction is complete. The clear solution is concentrated on a rotary evaporator, the precipitated reaction product is taken up in 10 ml of dichloromethane, extracted by shaking with water and purified on a silica gel column. Yield: 0.67 g (60%).

EXAMPLE 14

(Polymer I)

1.36 g (2.5 mmol) of 4-[N-methyl-N-2-(hydroxyethyl)amino]-4'-hexadecylsulfonylstilbene 8a are weighed into a 250 ml round-bottomed flask under a nitrogen blanket. To this are added 6.15 g of a 18% strength by weight polyacryloyl chloride [M$_w$ 20,000–30,000] solution in dioxane and 50 ml of dry N-methyl-2-pyrrolidone (NMP). After 10 minutes' stirring at room temperature 2.5 ml of dry pyridine are added to the clear yellow solution and the mixture is stirred for 8 hours at 50° C. After 16 hours 3.365 g of octadecylamine are added to the cooled solution and the mixture is stirred again for 8 hours at 50° C. Finally 50 ml of methanol are added and after a further 10 hours at 50° C. the solution is precipitated in acetone. The precipitated yellow polymer is purified by dissolving it in a mixture of dichloromethane/methanol and again precipitating it in acetone. The degree of incorporation of the colorant is determined as 32% by weight.

EXAMPLE 15

(Polymer II)

Use as in the above example of 1.92 g (2.5 mmol) of 4-(bishexadecyl)amino-4'-[(1-hydroxy)-3-propylsulfonyl] stilbene (4d) gives a yellow polymer with a chromophore incorporation of 33% by weight.

EXAMPLE 16

Copolymerization of 4-octadecyloxy-4'-[(1-methacryloyloxy)-3-propylsulfonyl]stilbene with HEMA (1:1) (Polymer III)

290.7 mg (0.46 mmol) of 13d and 59.2 mg of 2-hydroxyethyl methacrylate are dissolved with 1.5 ml of chlorobenzene in a Schlenk vessel. 2.2 mg of azobisisobutyronitrile (AIBN) dissolved in 0.65 ml of chlorobenzene are added and rinsed in with 1 ml of chlorobenzene. The Schlenk vessel is then tightly closed and freed of atmospheric oxygen by evacuating three times and each time refilling with nitrogen. After 24 hours at 65° C. the reaction solution is diluted with 2 ml of dichloromethane and 0.5 ml of methanol and precipitated in 100 ml of ethyl acetate. The precipitated product is checked for the absence of monomers by TLC and reprecipitated if necessary. Yield: 273.8 mg (78.3%) Colorant incorporation: 70% by weight (by UV/vis. spectroscopy)

In a similar way further copolymers with methyl methacrylate, methyl acrylate, hydroxyethyl acrylate, ethyl, propyl and butyl methacrylate and acrylate and so on can be prepared in good yields and with high colorant contents.

EXAMPLE 17

(SHG for Colorant Monolayers)

The SHG intensity was first measured for the colorant monolayers with the Maker Fringe apparatus.

For this purpose four hydrophilic glass substrates were coated with dye monolayers of I and II using an LB trough from Lauda. The coating conditions for the polymers I and II were as follows: water temperature: 20° C., lateral pressure on film: 15 mN/m, coating rate: 30 mm/min. The samples so produced were tested with the Maker Fringe apparatus to determine the SHG properties. All samples of the same material showed approximately similar SHG intensities. As expected, the SHG intensities of the monolayers of I and II are also of the same order of magnitude, since the same chromophore is used in both polymers.

The dependence of the SHG intensity on the incidence angle was the same for all samples of I and II. The measurement curves are symmetrical about an incidence angle of 0°. This confirms the above-discussed orientation of the chromophores in the dye monolayer.

Evaluation of the measurement curves gave the following $X^{(2)}$ values for the monolayers: $X^{(2)}$ (I)=8 pm/V; $X^{(2)}$ (II)=9 pm/V.

EXAMPLE 18

(SHG for Alternating Multilayers with Polymers I and II)

For the SHG measurements on alternating multilayers of I and II samples were produced from hydrophobic glass using the AB trough and 10, 20, 30, 50 and 200 coating cycles. The layers were prepared under the same conditions as the monolayers (cf. Example 15). The transfer ratio of I and II was independent of the number of layers and was approximately 1. The alternating coating gave homogeneous layers with good optical qualities.

The alternating multilayers so produced were examined with the Maker Fringe apparatus to determine their SHG properties. The SHG intensity increases quadratically with the number of layers, which is to be expected if the chromophore orientation is retained in the multilayered system. The angle-dependent SHG intensities are, as in the monolayers, symmetric about perpendicular laser incidence. From the measurement curves the following $X^{(2)}$ values for the alternating layer system were determined: $X^{(2)}$(I/II)=8 pm/V. The consistency of $X^{(2)}$ for samples of different thicknesses with the same alternating layer system is very good. The studies carried out show that the SHG activity and therefore the orientation of the chromophores is maintained in the alternating multilayer.

EXAMPLE 19

(Light Attenuation of 200 Cycles I/II)

The optical attenuation in the wave-conducting layer (200 AB cycles) was determined at 633 nm by the fiber-optic method described in W. Hickel et al, Thin Solid Films 210/211 (1992) 182–184, The attenuation is approximately 2.5 dB/cm, For a layer in which over 80% of the electric field is conducted in the wave-conducting layer this is a very good value,

What is claimed is:

1. An optical component comprising an electromagnetic radiation-transparent polymeric medium having a second-order susceptibility of at least $10^{-9}$ electrostatic units, the polymeric medium comprising compounds having polar-aligned noncentrosymmetric molecular dipoles which have as structural elements an electron acceptor which is bound to an electron donor via a conjugated w-electron system, which makes possible an oscillation of the molecular dipoles between a ground state having a first dipole moment and an electronically excited state having a second dipole moment different from the first dipole, wherein the polymeric medium comprises an alternating arrangement of at least one Langmuir-Blodgett film comprising at least two different nonionic polymers, having nonlinear optical properties, of the formulae (IIIa) and (IIIb), $$[[CH_2—CZ^1—COW]_k[CH_2—CZ^2—COOV]_l[CH_2—CZ^3—COOU]_t] \quad \text{III}$$

wherein:

$Z^1$, $Z^2$, $Z^3$: are, independently of one another, selected from the group consisting essentially of H, $CH_3$, $CF_3$, F, and Cl, V: is H or an alkyl group having from 1 to 6 carbon atoms, U: is a group Q-D-G-A (formula IIIa) or Q-A-G-D (formula IIIb), W is $NR^{12}R^{13}$ or $OR^{12}$ where $R^{12}$ and $R^{13}$ are H or an alkyl group having from 1 to 22 carbon atoms, t: is from 0.01 to 1.0, l: is from 0 to 0.5, k: is from 0 to 0.99, Q: is $—(CH_2)_p—X$, with X: $—O—$ or $—NR^1—$, and where X indicates the connection to the main chain of the polymer, p: is from 1 to 20, where one or two $CH_2$ groups can also be replaced by O, D: is $—NR^2R^3$, $—O—R^4$ or $—S—R^5$ wherein for compounds of formula (IIIa) a radical R is replaced by Q;

A is $—SO_2—R^6$ or $—BR^9R^{10}$,

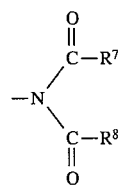

wherein for compounds of formula (IIIb) a radical R is replaced by Q;

G: 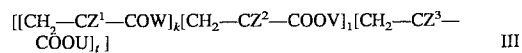 with Ar: 1,4-phenylene, naphthalene-2,6-diyl, thiazole-2,5-diyl, thiadiazole-2,5-diyl, thiophene-2,5-diyl, furan-2,5-diyl, oxazole-2,5-diyl, where either one or two hydrogen atoms can be replaced by $C_1$–$C_4$ alkyl or alkoxy groups,

Y: —C≡C—, —CH=CH—, —N=N—, —CH=N—, —N=CH—, —NH—N=CH—, —HC=N—NH—;

n, m: 0, 1, 2, 3;

wherein $R^1$, $R^2$, $R^3$, $R^4$, $R^5$, $R^6$, $R^7$, $R^8$, $R^9$ and $R^{10}$ are, independently of one another, a straight-chain or branched alkyl group having from 1 to 22 carbon atoms, where one or more non-neighboring $CH_2$ groups can also be replaced by O, which gives ether structures, and where $R^7$ and $R^8$ can together also form a ring;

and where D and G can also be parts of a ring system, as a result of which one of the substituents R can be a single bond.

2. The optical component as claimed in claim 1, wherein the symbols in the formulae (IIIa) and (IIIb) have the following meanings:

D: $NR^2R^3$, $OR^4$ or $SR^5$

A: —$SO_2$—$R^6$ and

G: $Ar^1$—$Y_{(m)}$—$Ar_n^2$ with $Ar^1$, $Ar^2$: 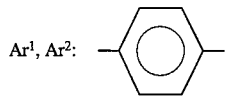

Y: —CH=CH— and n, m: 0, 1, or 2.

3. The optical component as claimed in claim 1, wherein $Ar$—$Y_{(n)}$—$Ar_{(m)}$ is:

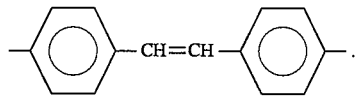

4. A process for producing the optical component as claimed in claim 3 comprising:

a) preparing compounds of formulae Ia and IIa

Q—D—Ar—CH=CH—Ar—$SO_2$—$R^6$     Ia

D—Ar—CH=CH—Ar—$SO_2$—Q     IIa in which the symbols have the meanings given for formula III, which comprises reacting a compound of formula IVa or IVb $H_3C$—Ar—$SO_2$—Q     IVa $H_3C$—Ar—$SO_2$—$R^6$     IVb in which the symbols have the meanings given for formula III, and where a free OH or NHR group may be provided with a protecting group, with an aldehyde of formula Va or Vb D—Ar—CHO     Va Q—D—Ar—CHO     Vb in which the symbols have the meanings given for formula III, in a polar aprotic solvent in the presence of a mixture of a strong base and its conjugate weak acid in a ratio between 4:1 and 1:1 over a period of from 10 minutes to 3 days at a temperature of from 20° C. to 160° C. and subsequently cleaving off any protecting group;

b) reacting the respective compounds with polymeric acrylic acid derivatives in an inert solvent in the presence of a base, saturating residual acid derivative functions of the resulting polymer with long-chain amines or alcohols; reacting any final remaining acid derivative functions with short chain alcohols, thereby obtaining polymers of formulae (IIIa) and (IIIb), and c) applying alternating films of the polymers of formulae (IIIa) and (IIIb) thus obtained onto a substrate by means of the Langmuir-Blodgett-method.

5. The optical component as claimed in claim 1, comprising from 2 to 1000 double layers of polymers of formulae (IIIa) and (IIIb).

6. The optical component as claimed in claim 1, comprising from 50 to 500 double layers of polymers of formulae (IIIa) and (IIIb).

7. The optical component as claimed in claim 1, comprising from 100 to 300 double layers of polymers of formulae (IIIa) and (IIIb).

8. A process for producing an optical component as claimed in claim 1, which comprises applying alternating films of polymers of formulae (IIIa) and (IIIb) onto a substrate by means of the Langmuir-Blodgett method.

9. An electro-optical switch comprising the optical component as claimed in claim 1.

10. A frequency doubler comprising the optical component as claimed in claim 1.

* * * * *